United States Patent [19]

Hair

[11] 4,083,451
[45] Apr. 11, 1978

[54] METHOD OF HEAT SEALING SHEET-FORM LAYERS OF PERFORATED PLASTIC BETWEEN LAYERS OF PAPERBOARD

[76] Inventor: George R. Hair, 173rd E. 3rd St., Clifton, N.J. 07011

[21] Appl. No.: 609,033

[22] Filed: Aug. 29, 1975

Related U.S. Application Data

[62] Division of Ser. No. 289,091, Sep. 14, 1972, Pat. No. 3,923,578.

[51] Int. Cl.² .................... B65D 75/26; B65D 75/30
[52] U.S. Cl. ......................................... 206/461; 206/463; 206/45.33; 206/484; 206/489; 206/530; 206/534.1; 206/539; 229/48 T
[58] Field of Search ................. 206/484, 528, 529, 530, 206/538, 539, 531, .83, 534.1, 497, 489, 461, 463, 45.33; 229/48 T

[56] References Cited

U.S. PATENT DOCUMENTS

| | | | |
|---|---|---|---|
| 2,461,660 | 2/1949 | Salfisberg | 206/484 |
| 2,780,353 | 2/1957 | Volckening | 206/539 |
| 3,054,503 | 9/1962 | Hartman, Jr. et al. | 206/531 |
| 3,203,541 | 8/1965 | Rein | 206/539 |
| 3,217,871 | 11/1965 | Lee | 206/484 |
| 3,302,773 | 2/1967 | Weir et al. | 206/.83 |
| 3,494,322 | 2/1970 | Dubbels | 206/539 |
| 3,669,256 | 6/1972 | Jacob | 206/484 |
| 3,809,217 | 5/1974 | Harrison | 206/484 |

Primary Examiner—William Price
Assistant Examiner—Joseph Man-Fu Moy
Attorney, Agent, or Firm—H. Hume Mathews

[57] ABSTRACT

Each sheet-form layer of plastic film to be superposed with another layer between layers of non-heat conducting material, such as paperboard, is perforated in a pattern such that, when the layers of plastic are superposed between the layers of normally non-heat conducting material for heat sealing, the perforations of each layer of plastic are aligned with imperforated portions of the superposed perforated layer of plastic. When sealing heat and pressure are applied to the superposed layers of plastic and paperboard or the like by conventional heated dies, each layer of plastic is rapidly sealed to the inner surface of both layers of paperboard, or, if initially sealed to the inner surface of one layer, is rapidly sealed directly to the inner surface of the other layer of paperboard. The article display package encloses an article between two sealed layers of sheet-form plastic forming transparent windows in openings of two superposed layers of paperboard to each of which both layers of plastic are also sealed.

4 Claims, 10 Drawing Figures

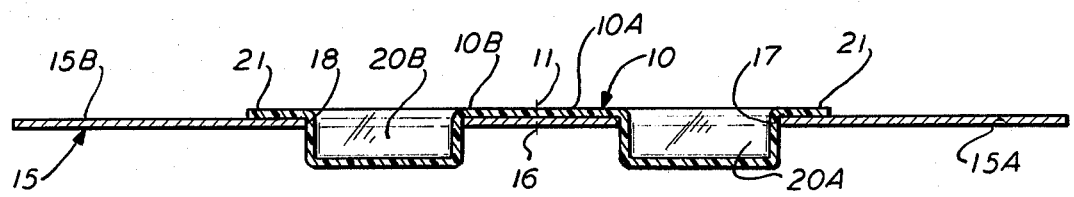
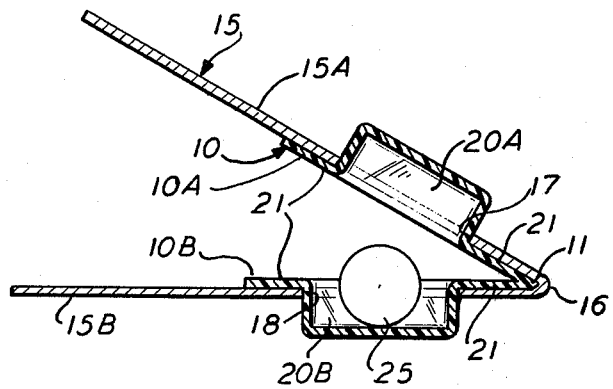
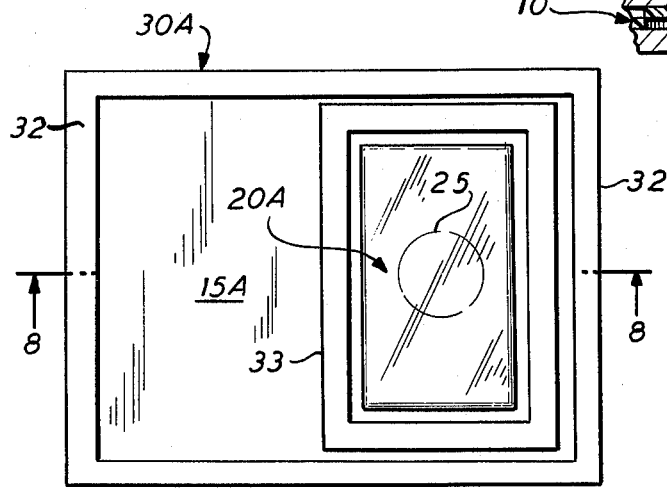
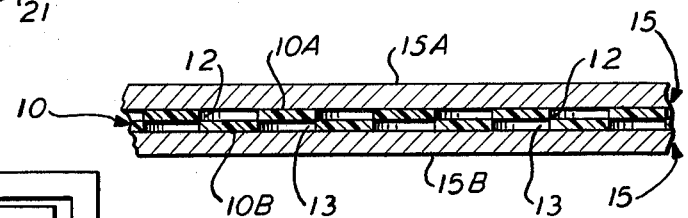
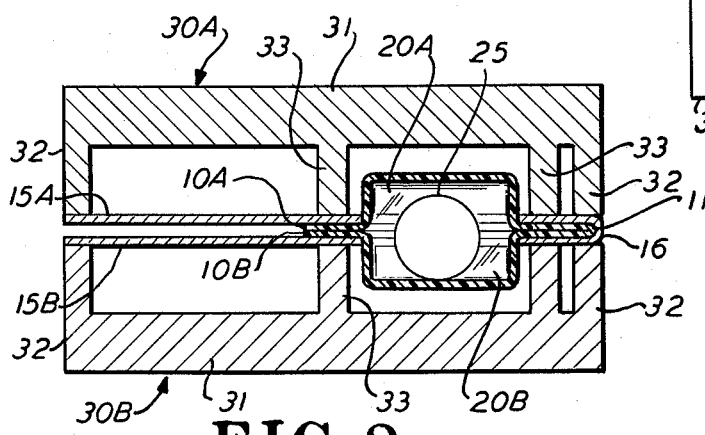
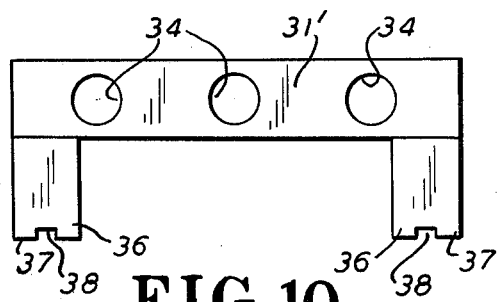

METHOD OF HEAT SEALING SHEET-FORM LAYERS OF PERFORATED PLASTIC BETWEEN LAYERS OF PAPERBOARD

FIELD AND BACKGROUND OF THE INVENTION

This is a divsion of application Ser. No. 289,091, filed Sept. 14, 1972, now U.S. Pat. No. 3,923,578, Dec. 2, 1975.

This invention relates to the heat sealing of two or more layers of plastic film or sheet positioned between layers of normally non-heat conducting material such as paperboard, and to an article display package produced thereby.

In making display packages in which an article is sealed between two layers of transparent plastic film or sheet for display through cut-outs or windows in paperboard layers between which the layers of plastic film or sheet are positioned, with the layers of plastic film or sheet being sealed to each other and to the layers of paperboard, heat sealing is effected either by RF heating means, in a relatively short time, or by conventional heat sealing methods, involving heated dies and the like, but requiring relatively long sealing times. The application of RF heat causes the plastic film or sheet to absorb the RF energy causing it to heat and fuse. However, RF heat sealing apparatus is relatively expensive as compared to conventional heat sealing apparatus, such as heated dies.

When using conventional heat sealing apparatus, the heat must pass through the paperboard and through the superposed layers of plastic sheet or film in order to heat the plastic to its fusing temperature. While conventional heat sealing apparatus is relatively inexpensive, the sealing time is greatly extended so that production is considerably slowed.

SUMMARY OF THE INVENTION

The objective of the present invention is to provide fast heat sealing in the formation of article display packages but using inexpensive conventional heat sealing equipment. In particular, the present invention is directed to the rapid heat sealing, using inexpensive equipment, of at least two superposed layers of plastic film or sheet positioned between layers of normally non-heat conducting material such as paperboard to form an article display package with transparent windows.

The invention is based on the fact that a single layer of heat sealable plastic film or sheet is readily heat sealable to a treated or untreated surface of paperboard, or other normally non-heat conducting material, with the heat being applied through the paperboard. The present invention takes advantage of this fact by perforating each sheet-form layer of plastic in a pattern such that, when the layers are superposed with each layer in direct contact with a respective layer of normally non-heat conducting material and spaced from the other layer of normally non-heat conducting material by the superposed layer of perforated plastic, the perforations of each layer of plastic are aligned with imperforate portions of the superposed perforated layer of plastic. Thus, each layer of plastic is readily heat sealed to the adjacent layer of normally non-heat conducting material and can also be readily heat sealed to the other layer of normally non-heat conducting material through the perforations in the superposed perforated layer of plastic.

In forming a display package of the mentioned type in which a layer of plastic sheet or film is superposed on a layer of paperboard, either with or without being initially sealed thereto, after which the paperboard is folded on itself so that the two halves of the layer of sheet-form plastic are superposed, in accordance with the invention, imperforate areas of each of the two folded halves of the plastic film or sheet are matched up or aligned with perforated portions of the other half of the film or sheet. Thus, each layer of the folded paperboard can be heat sealed to the sheet-form layer of plastic separated therefrom by an interposed layer of sheet-form plastic directly through the perforations of the interposed layer of sheet-form plastic. Consequently, the heat sealing can be effected inexpensively and rapidly using conventional heat sealing procedures, such as the use of heated dies.

An object of the invention is to provide an improved method of heat sealing two or more layers of plastic film or sheet to layers of normally non-heat conducting material between which the superposed layers of film or sheet are positioned.

Another object of the invention is to provide such a method of heat sealing in which heat sealing can be effected rapidly and expeditiously using conventional heat sealing dies or the like.

A further object of the invention is to provide such a method of heat sealing in which each layer of plastic film or sheet has portions heat sealed directly to both layers of normally non-heat conducting material, such as paperboard.

Another object of the invention is to provide an improved heat sealed article display package formed of heat sealable plastic film or sheet and paperboard.

For an understanding of the principles of the invention, reference is made to the following description of typical embodiments thereof as illustrated in the accompanying drawing.

BRIEF DESCRIPTION OF THE DRAWING

In the drawing:

FIG. 5 is a sectional view illustrating a sheet or film of plastic, perforated in accordance with the invention and either preformed or formed in place, as heat sealed to a foldable sheet of paperboard;

FIG. 6 is a view, similar to FIG. 5, illustrating the folding of the paperboard with the layer of plastic film or sheet heat sealed thereto;

FIG. 7 is a plan view of a heat sealing die used in performing the method of the invention;

FIG. 8 is a sectional view taken on the line 8—8 of FIG. 7;

FIG. 9 is an enlarged partial sectional view of the superposed layers of plastic film or sheet and paperboard; and FIG. 10 is an end elevation view of a modified form of die.

DESCRIPTION OF THE PREFERRED EMBODIMENTS

Figure 1:
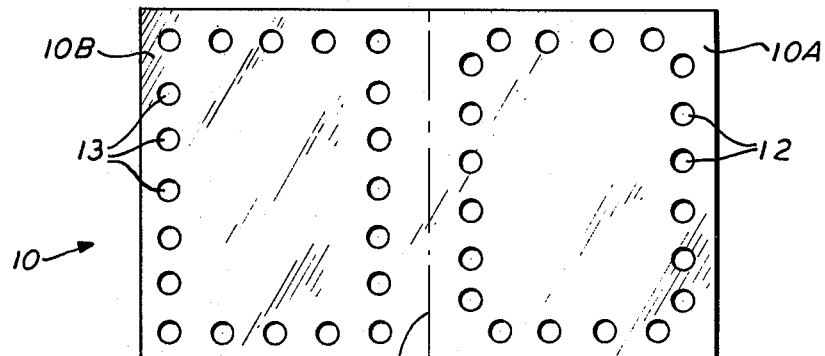
FIG. 1 is a plan view of a sheet of plastic perforated in accordance with the invention and arranged to be folded on a median fold line.

Referring first to FIG. 1 of the drawing, a sheet-form layer of transparent plastic, such as polyvinyl chloride or an acetate synthetic resin, is indicated at 10 as divided, by a median fold line 11, shown in broken lines, into halves 10A and 10B. Sheet or film 10 is designed to be folded about median fold line 11 so that portion 10A is superposed on portion 10B. While PVC and an acetate resin have been indicated as suitable materials for forming the plastic sheet or film 10, it should be understood that any readily heat sealable plastic composition material can be used, such as polyethylene resin or a resin sold under the tradename SURLYN.

In accordance with the invention, each half of plastic sheet or film 10 is formed with a series of perforations, the perforations in sheet half 10A being indicated at 12 and those in sheet half 10B being indicated at 13. It will be noted that perforations 12 are staggered with respect to perforations 13 so that, when sheet or layer 10 is folded about its median fold line, each perforation 12 will be opposite an impreforate portion of sheet half 10B and each perforation 13 will be opposite an imperforate portion of sheet half 10A. More particularly, in the particular example illustrated, there are six perforations 12 in each of the two longer rows in sheet half 10A, whereas sheet half 10B has seven perforations 13 in each of its two longer rows. The same holds true with respect to the two shorter rows of each half of sheet 10. However, it should be understood that the number of perforations in each sheet half, and the particular arrangement thereof in each sheet half, is not limited to the number and pattern illustrated in FIG. 1, as the only prerequisite is that each perforation in one half of the sheet or film must, when the sheet or film is folded about its fold line 11, match up with an imperforate area of the other half of the sheet or film.

Figure 2:
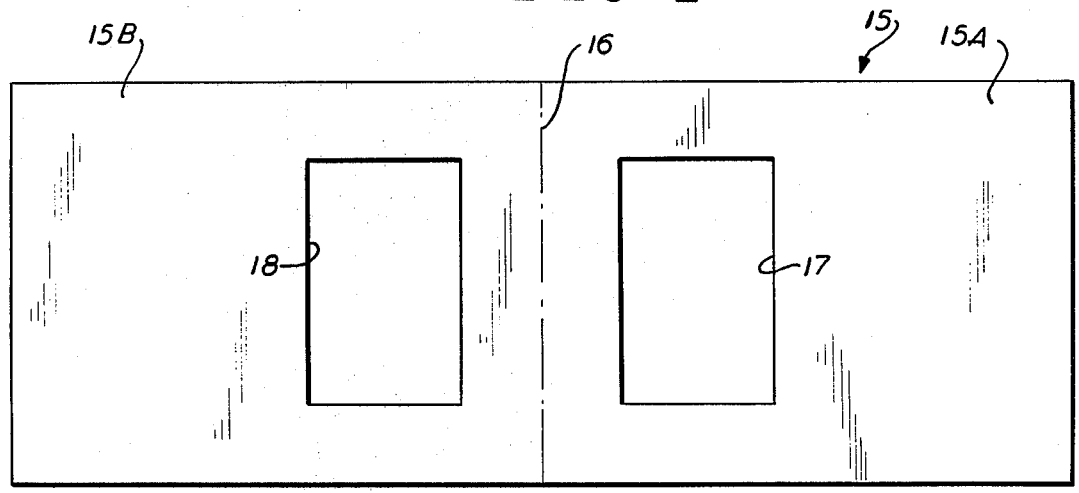
FIG. 2 is a plan view of a paperboard enclosure formed with cut-out windows, and foldable on a median fold line for use in a display package.

Plastic sheet or film 10, shown in FIG. 1, is designed to form the transparent enclosure for an article sealed in a display package further comprising a folded sheet or paperboard 15 as shown in FIG. 2. Paperboard sheet 15 is divided, by median fold line 16, into two halves 15A and 15B. Each half of sheet 15 is formed with a respective cut-out window 17 and 18, and these windows are alignable with each other when sheet 15 is folded about fold line 16. While the windows are indicated as rectangular, this is merely by way of illustration as the windows may have any contour desired. By the term "paperboard" as used herein is intended to be meant any normally non-heat conductive material used in forming article display packages having transparent windows.

Figure 3:
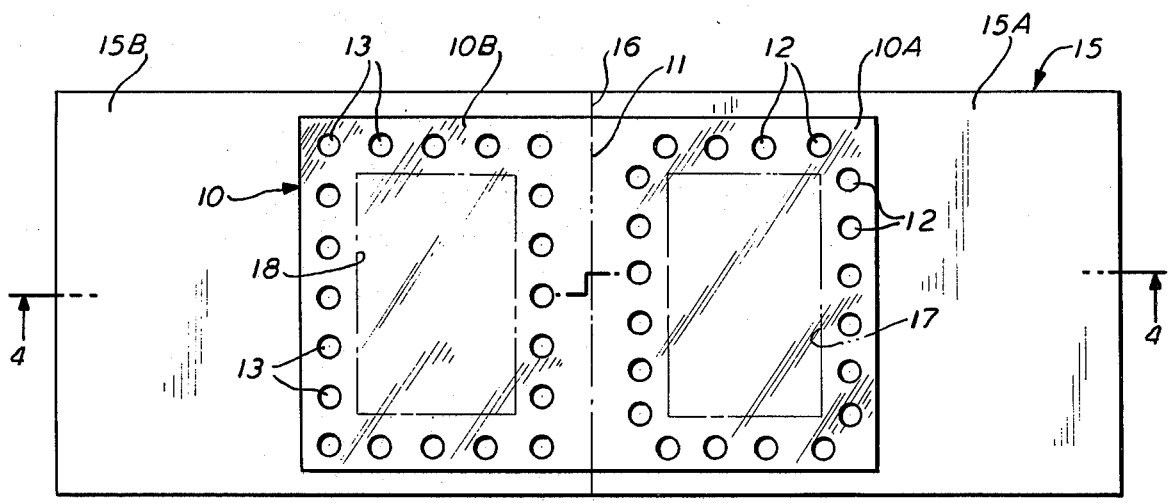
FIG. 3 is a plan view of the plastic film or sheet shown in FIG. 1 as heat sealed to the paperboard shown in FIG. 2.
Figure 4:
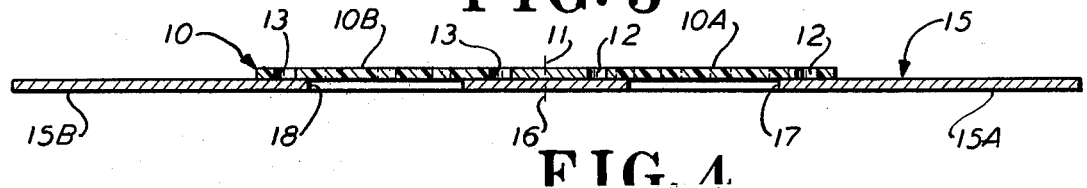
FIG. 4 is a sectional view on the line 4—4 of FIG. 3.

As a first step in forming the display package, the sheet-form layer of plastic 10 is placed on paperboard sheet 15 with fold lines 11 and 16 coincident, as shown in FIGS. 3 and 4. Plastic sheet or film 10 may be then heat sealed to paperboard sheet 15, at least along the peripheral portions of plastic sheet 10, with unperforated portions of plastic sheet 10 overlying the windows 17 and 18.

In FIGS. 1, 3 and 4, plastic film sheet 10 has been illustrated as non-deformed, except for the perforations 12 and 13. Certain articles may be enclosed in the transparent pouch or window formed by the two halves of sheet or film 10 upon folding over of sheet 15 with sheet or film 10 superposed thereon, without sheet 10 being deformed to form an actual recess. However, and as shown in FIGS. 5 and 6, in many cases sheet 10 is deformed to form pockets, such as 20A and 20B, which are insertable through the respective windows 17 and 18 of sheet 15. These pockets may be either preformed in sheet or film 10 or formed therein after sheet or film 10 is superposed, with or without initial heat sealing, on paperboard sheet 15. The provision of these pockets enables larger articles or a greater number of articles to be enclosed between the folded over layers of plastic film or sheet. One such article is indicated schematically at 25. In the example shown in FIGS. 5 and 6, sheet 10 may be also heat sealed to sheet 15 in advance of folding of the two sheets about the common fold line 11–16. The article 25 is placed in one of the pockets, such as the pockets 20B, and then sheet 15, with plastic sheet or film 10 superposed thereon either with or without being initially heat sealed thereto, is folded over as indicated in FIG. 6 for later heat sealing of the parts to form a closed transparent pocket.

The perforations are formed in sheet or film 10, when the latter is deformed to form the pockets 20A and 20B, in the same manner as when sheet or film 10 is not deformed. That is, the perforations in the two halves 10A and 10B are formed in the marginal or flat portions 21 of sheet or film 10 in such a way that, when the display package is folded about the common fold line 11–16, the perforations in one half of sheet or film 10 will be aligned with imperforate areas of the other half of sheet-form layer 10. Thus, when the package is folded, portion 10A of layer 10, which may be already heat sealed to portion 15A of sheet 15, is juxtaposed with portion 10B of layer 10, and the subsequent heat sealing unites the imperforate portions of sheet half 10A to sheet half 15B through the perforations 13 of sheet half 10B, thus permitting a quick sealing with conventional heat sealing means. The same holds true, of course, for layer half 10B, which may be initially heat sealed to sheet half 15B, which is directly heat sealed to sheet half 15A, after folding of the package, through the perforations 12.

Alternatively, the sheet of plastic material may be initially superposed on the paperboard without heat sealing thereto, and heat sealing of each plastic sheet-half the inner surfaces of both paperboard halves being effected simultaneously after folding of the sheets.

To effect the final heat sealing to form the display package, the folded over sheets 10 and 15 are pressed between mating heat sealing dies 30A and 30B, which are conventional heat sealing dies as distinguished from RF heat sealing means. Each heat sealing die 30A and 30B includes a body or web portion 31 from which there depends a peripheral rim portion 32 conforming to the general shape of one-half of the paperboard sheet 15, and an intermediate rim portion 33. Each die further includes an inner rim portion, which in the illustrated embodiment is substantially rectangular in plan, and corresponds to the perforated areas of the superposed sheet or film halves 10A and 10B. The dies 30A and 30B press the folded over assembly together under pressure and with the application of heat to effect the heat seal.

FIG. 9 illustrates, to a very large scale, how the perforations 12 and 13 of the plastic layer halves 10A and 10B, respectively, are staggered so that each perforation of one-half of layer 10 is opposite an imperforate portion of the other half of layer 10. Thus, each half of sheet or film 10, already heat-sealed to a respective half of paperboard sheet 15, is directly heat sealed to the other half of paperboard sheet 15. As stated, this allows the use of conventional heat sealing dies to perform a speecy heat sealing in an inexpensive manner not requiring the use of R.F. heat sealing means.

FIG. 10 illustrates a slightly different form of heat sealing die wherein the web 31' is formed with bores 34 to receive suitable heating means and in which those portions 36 of the inner pressing foot or margin adjacent portion 37 of the outer presser foot or margin are substantially integral therewith except at their sheet engaging ends. At the sheet engaging ends, the portions 36 are separated from the portions 37 by a channel or groove 38. However, it should be understood that the exact form of conventional heat sealing die used in performing the final heat sealing operation is unimportant, provided it is effective to apply heat and pressure to the superposed layers of plastic film or sheet and paperboard, and at the perforated portions of the superposed layers of plastic film or sheet.

While specific embodiments of the invention have been shown and described in detail to illustrate the application of the principles of the invention, it will be understood that the invention may be embodied otherwise without departing from such principles.

What is claimed is:

1. An article display package comprising at least one article enclosed between two superposed sheet-form layers of transparent plastic positioned between two layers of paperboard, each layer of plastic having openings therein with the openings in one layer being offset with respect to the openings in the other layer so that each layer of plastic is in direct contact with, and is heat sealed to, both layers of paperboard along marginal areas bounding a window cut-out in at least one layer of paperboard.

2. An article display package, as claimed in claim 1, in which each layer of plastic has a series of spaced perforations extending throughout said marginal areas; the perforations in the two layers of plastic having a pattern such that each perforation in one layer of plastic is aligned with an imperforate portion of the other superposed layer of plastic.

3. An article display package, as claimed in claim 1, in which each layer of paperboard has a respective window cut-out, the two window cut-outs being coincident with each other.

4. An article display package, as claimed in claim 2, in which each layer of plastic is formed with a pocket projecting outwardly through and conforming peripherally with the window cut-out in the adjacent layer of paperboard.

* * * * *